United States Patent [19]

Ono et al.

[11] Patent Number: 4,766,423
[45] Date of Patent: Aug. 23, 1988

[54] THREE-DIMENSIONAL DISPLAY APPARATUS

[75] Inventors: Seigo Ono, Kofu; Osamu Ebina, Atsugi, both of Japan

[73] Assignee: Hitachi, Ltd., Tokyo, Japan

[21] Appl. No.: 375

[22] Filed: Jan. 5, 1987

[30] Foreign Application Priority Data

Jan. 7, 1986 [JP] Japan .................................. 61-1089

[51] Int. Cl.$^4$ ............................................. G06F 3/14
[52] U.S. Cl. ..................................... 340/709; 340/726; 340/700; 364/521; 434/43
[58] Field of Search ............... 340/723, 724, 725, 709, 340/727, 729, 728, 700, 705; 364/521, 522, 190, 188, 189; 434/43, 44, D28; 273/D28

[56] References Cited

U.S. PATENT DOCUMENTS

| 3,632,181 | 1/1972 | Lee | 434/44 |
|---|---|---|---|
| 3,664,722 | 5/1972 | Kiji et al. | 340/700 |
| 3,883,861 | 5/1975 | Heartz | 340/705 |
| 4,027,148 | 5/1977 | Rosenthal | 364/521 |
| 4,127,849 | 11/1978 | Okor | 340/729 |
| 4,148,014 | 4/1979 | Burson | 340/709 |
| 4,552,360 | 11/1985 | Bromley et al. | 273/D28 |
| 4,654,648 | 3/1987 | Herrington | 340/709 |

Primary Examiner—Marshall M. Curtis
Assistant Examiner—Roland K. Bowler, II
Attorney, Agent, or Firm—Antonelli, Terry & Wands

[57] ABSTRACT

A cursor moves at a constant velocity in a constant direction in a display space for displaying a three-dimensional image. When two parameters for representing a direction in a three-dimensional space are entered, the cursor changes its direction according to the entered direction at a rate determined by the entered magnitude. When a parameter for changing the velocity is entered, the cursor velocity is changed. It is not necessary to enter a three-dimensional coordinate to control the cursor to reach the desired position, and the manipulation of the cursor is very much simplified.

17 Claims, 6 Drawing Sheets

FIG. 4

VECTOR CURSOR PARAMETER STORAGE

| # | CONTENT OF REGISTER | | VALUE |
|---|---|---|---|
| 1 | VECTOR CURSOR POSITION | (P) | $(P_x, P_y, P_z)$ |
| 2 | VECTOR CURSOR VELOCITY VECTOR | (F) | $(F_x, F_y, F_z)$ |
| 3 | VECTOR CURSOR VERTICAL ROTATION AXIS VECTOR | (H) | $(h_x, h_y, h_z)$ |
| 4 | VECTOR CURSOR HORIZONTAL ROTATION AXIS VECTOR | (V) | $(v_x, v_y, v_z)$ |

THREE-DIMENSIONAL DISPLAY APPARATUS

BACKGROUND OF THE INVENTION

1. Field of the Invention

The present invention relates to a three-dimensional display device, and more particularly to a three-dimensional display device having a cursor which can be arbitrarily moved in a three-dimensional space by being driven by a two-dimensional input device.

2. Description of the Related Art

In a recent pattern processing system, it is a general trend to use three-dimensional coordinates. A displayed pattern may be edited by addition, correction or movement, for example, or a view point of the displayed pattern may be changed. In order to achieve those functions, it is convenient to designate a position by using a cursor on a three-dimensional space. Usually, it is necessary to display a pattern as well as a cursor on a display device having a two-dimensional spread such as a CRT. In the past, a cursor position on the three-dimensional space is designated by three-dimensional coordinates entered by, for example, a keyboard. This involves a problem in operability.

SUMMARY OF THE INVENTION

It is an object of the present invention to provide a three-dimensional display device having a movable three-dimensional cursor.

It is another object of the present invention to provide a method for controlling the movement of a cursor displayed in a three-dimensional space in accordance with a two-dimensional input device and displaying the moved cursor in the displayed three-dimensional space.

BRIEF DESCRIPTION OF THE DRAWINGS

FIG. 4 shows a table of content of a storage 307 for vector cursor parameters in the display device shown in FIG. 3.

DESCRIPTION OF THE PREFERRED EMBODIMENTS

Embodiments of the present invention are now explained with reference to the drawings.

Figure 1:
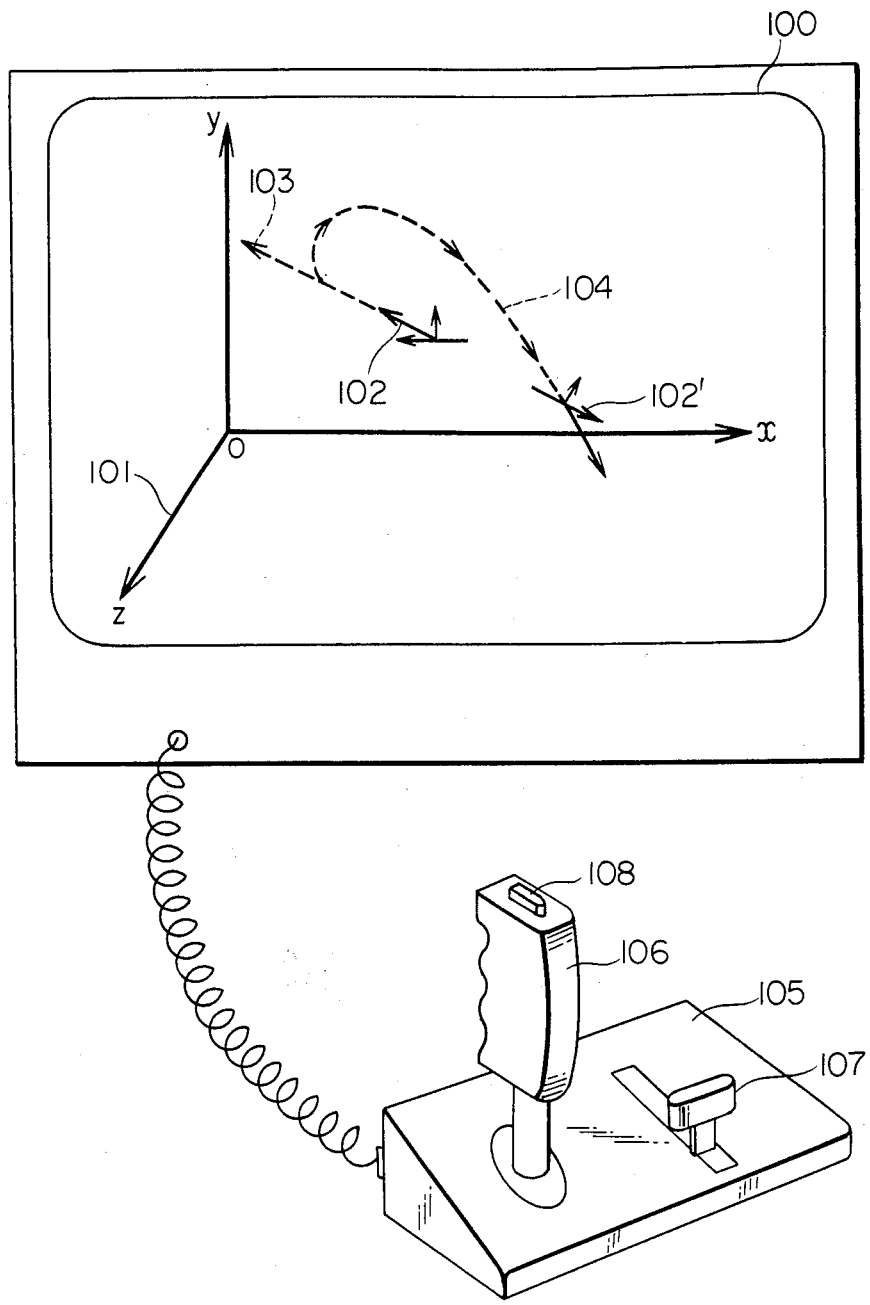
FIG. 1 shows a schematic view of a display screen and an input device for illustrating the present invention.

FIG. 1 illustrates a general concept of the present invention.

A three-dimensional space is displayed on a display screen 100 of a display device. In FIG. 1, it is shown by three-dimensional orthogonal coordinates (x, y, z) 101. A cursor 102 is virtually located in the three-dimensional space and moves in the space like an airplane. It is a cursor having a velocity vector as an attribute. (It is hereinafter referred to as a vector cursor.) It is initially oriented in certain direction 103, but when an operator manipulates an input device 105, its direction is changed and it moves to 102' through a locus 104.

The input device 105 has direction component input means 106 and velocity component input means 107. The direction component input means 106 produces a signal to designate a direction of the cursor 102. It designates two variables for determining the amount of rotation around axes represented by two supporting vector cursors in the plane normal to the direction of a vector cursor. The velocity component input means produces a signal for designating the velocity of the cursor 102. If the direction component input means 106 is left unmanipulated, the cursor keeps its direction 103. If the velocity component input means 107 is left unmanipulated, the cursor moves at a constant velocity. If the velocity is set to zero, the cursor 102 stops. The operator moves the vector cursor to a desired position by using those means, and enters the coordinate designated by the cursor through an input switch 108. In order to display the three dimensional space to be displayed including the vector cursor on a two-dimensional screen 100, the three dimensional information is converted to a two-dimensional image and displayed on the two-dimensional screen.

Figure 2:
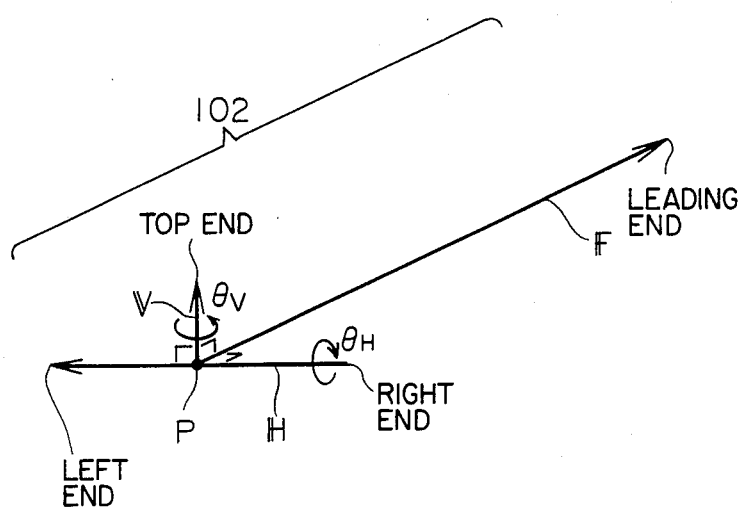
FIG. 2 shows a diagram of a vector cursor of the present invention.

FIG. 2 shows a simple appearance of the vector cursor. A vector cursor can be displayed in a manner similar to an airplane, but the minimum requirement is to show the direction of movement (vector F), an axis of horizontal rotation (vector V) and an axis of vertical rotation (vector H). The velocity vector of the vector cursor is represented by F. Forward and backward angle information of the direction component input means 106 designates a rotation angle $\theta_H$ around the rotation axis vector H, and leftward and rightward angle information of the direction component input means 106 designates a rotation angle $\theta_V$ around the rotation axis vector V. Vectors F, V and H are orthogonal to one another. Thus, the direction of the vector F can be changed as required. The magnitude of F is controlled by the velocity component input means 107. Regarding the rotation axis vectors V and H, only the directions are the necessary information as axes; however, they should have different appearance for operators to distinguish them easily. In FIG. 2, the length is different. Other differences such as thickness, double-line or broken/solid line or suffixes, also may be used for discrimination.

A coordinate of the point P of the vector cursor is represented by a vector coordinate P=(Px, Py, Pz). Coordinates of the other points of the vector cursor of FIG. 2 can be calculated as follows.

Leading end of vector cursor = P + F

Top end of vector cursor = P + V

Right end of vector cursor = P − ½H

Left end of vector cursor = P + ½H

The direction input means 106 designates the rotation angles $\theta_H$, $\theta_V$ of the vector cursor by inclination angles, and the relationship between the inclination angles and the rotation angle may be arbitrary (either linear or non-linear). In case of a linear relationship, the direction of the vector F is changed by $\theta = \alpha/\beta\phi$ when a joy stick 106 is inclined by $\phi$, where $\alpha$ is a maximum change of direction of the vector F and $\beta$ is a maximum inclination angle of the joy stick 106. In case of a non-linear relationship, changes of $\theta_H$ and $\theta_V$ may be small when the joy stick 106 is inclined within certain angle range, and changes of $\theta_H$ and $\theta_V$ are large when the joy stick 106 is inclined by more than a predetermined angle. In this case, fine positioning as well as coarse positioning are facilitated. The input means 106 is not limited to the illustrated joy stick but any other means which can designate angles in two directions (two parameters). Continuous direction change is preferable, an example is a mouse.

Figure 3:
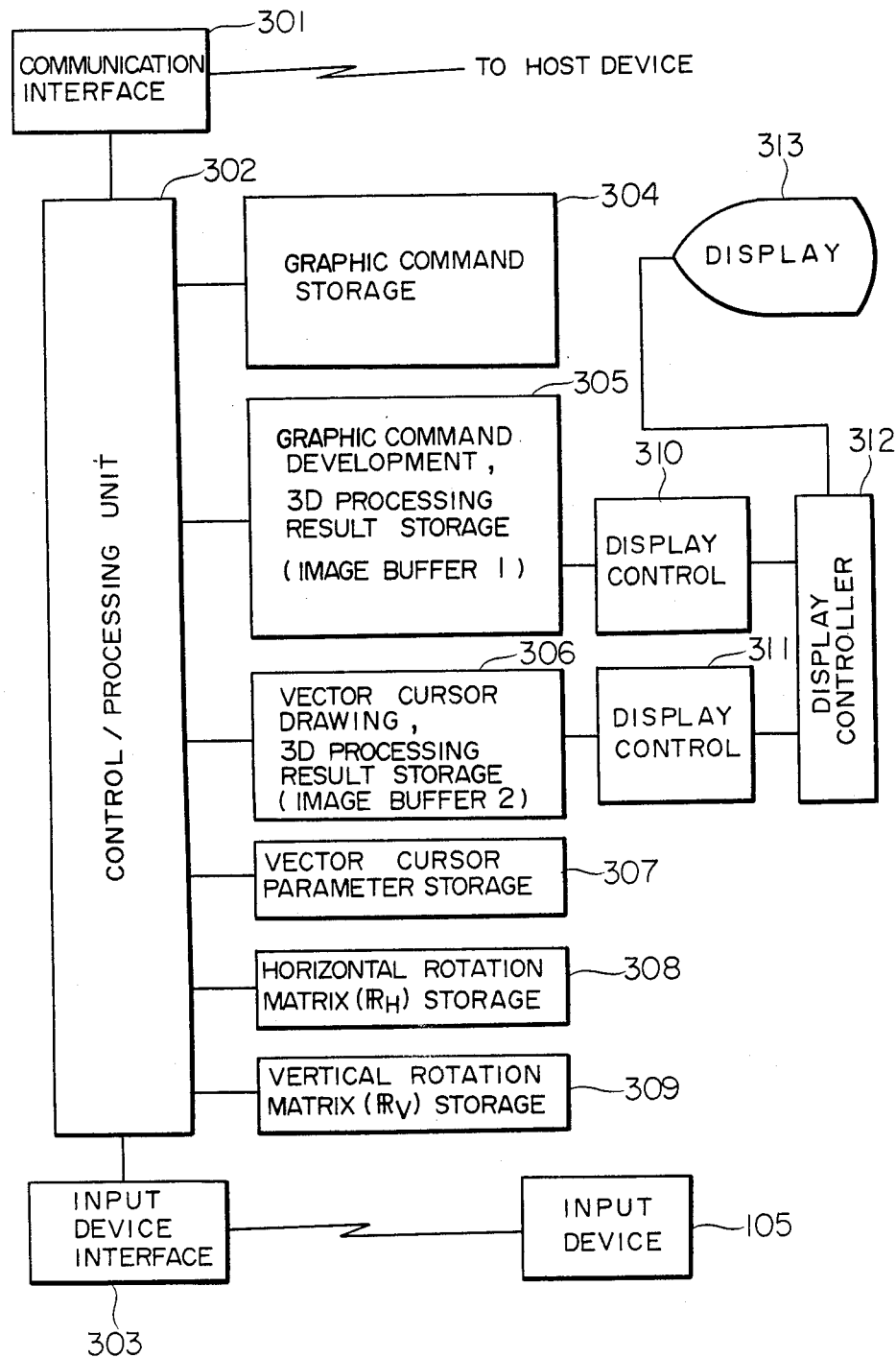
FIG. 3 shows a block diagram of one embodiment of a display device of the present invention.

FIG. 3 shows a block diagram of a configuration of one embodiment. A three-dimensional pattern to be displayed is sent from a host device such as a computer in a form of a graphic command prior development of pixels. The graphic command is supplied from the host device through a communication interface 301 and stored into a graphic command storage 304 under control of a control/processing unit 302, which performs shading processing and perspective conversion (three-dimension for two-dimension conversion) processing to the information in the graphic command storage 304 and stores the processing result, that is, image command development information into an image buffer 305.

On the other hand the control information from the input device 105 is supplied through an input device interface 303 and processed by the control/processing unit 302. The angle information from the direction input means 106 is converted to the conversion matrices $\mathbb{R}_H$ and $\mathbb{R}_V$ through processing to be described later and they are stored in a horizontal rotation conversion matrix ($\mathbb{R}_H$) storage 308 and a vertical rotation conversion matrix ($\mathbb{R}_V$) storage 309. The velocity information from the velocity input means 107 is converted to a magnitude of the velocity vector $\mathbb{F}$ which is stored into a vector cursor parameter storage 307.

The control/processing unit 302 perspectively converts the content of the vector cursor parameter storage 307 to two-dimensional information for the two-dimensional display device and stores it into the image buffer 306. The contents of the image buffers 305 and 306 are read out by display controls 310 and 311 and they are combined by a display controller 312 and converted to a form which is acceptable by a display device 313, and it is supplied to the display device 313. In this manner, the three-dimensional image is displayed on the two-dimensional screen.

FIG. 4 shows the content of the vector cursor parameter storage 307. The coordinate (Px, Py, Pz) of the vector cursor and the coordinates of the three vectors $\mathbb{F}$, $\mathbb{H}$ and $\mathbb{V}$ of the vector cursor are stored therein. (At the start of the system, appropriate initial values are set to those coordinates.)

The vector cursor continues to move in accordance with the preset $\mathbb{F}$ even if no direction is given from the input device 105. The control/processing unit 302 periodically updates the coordinate of P in the vector cursor parameter storage 307 and updates the content of the image buffer 306. If there is an input from the input device 105, the information in the storages 307–309 are updated and the vector cursor moves at a velocity and a direction determined by $\mathbb{F}$.

In order for the cursor to be viewed to move smoothly, it is preferable that a unit time is shorter than 1/30 second. While the velocity vector $\mathbb{F}$ itself has a magnitude which is proportional to the velocity, it may be displayed to be no smaller than a predetermined magnitude or may have a subsidiary arrow to show a direction. Then, it becomes easy to determine the direction of the vector $\mathbb{F}$, when the velocity is small.

Figure 5:
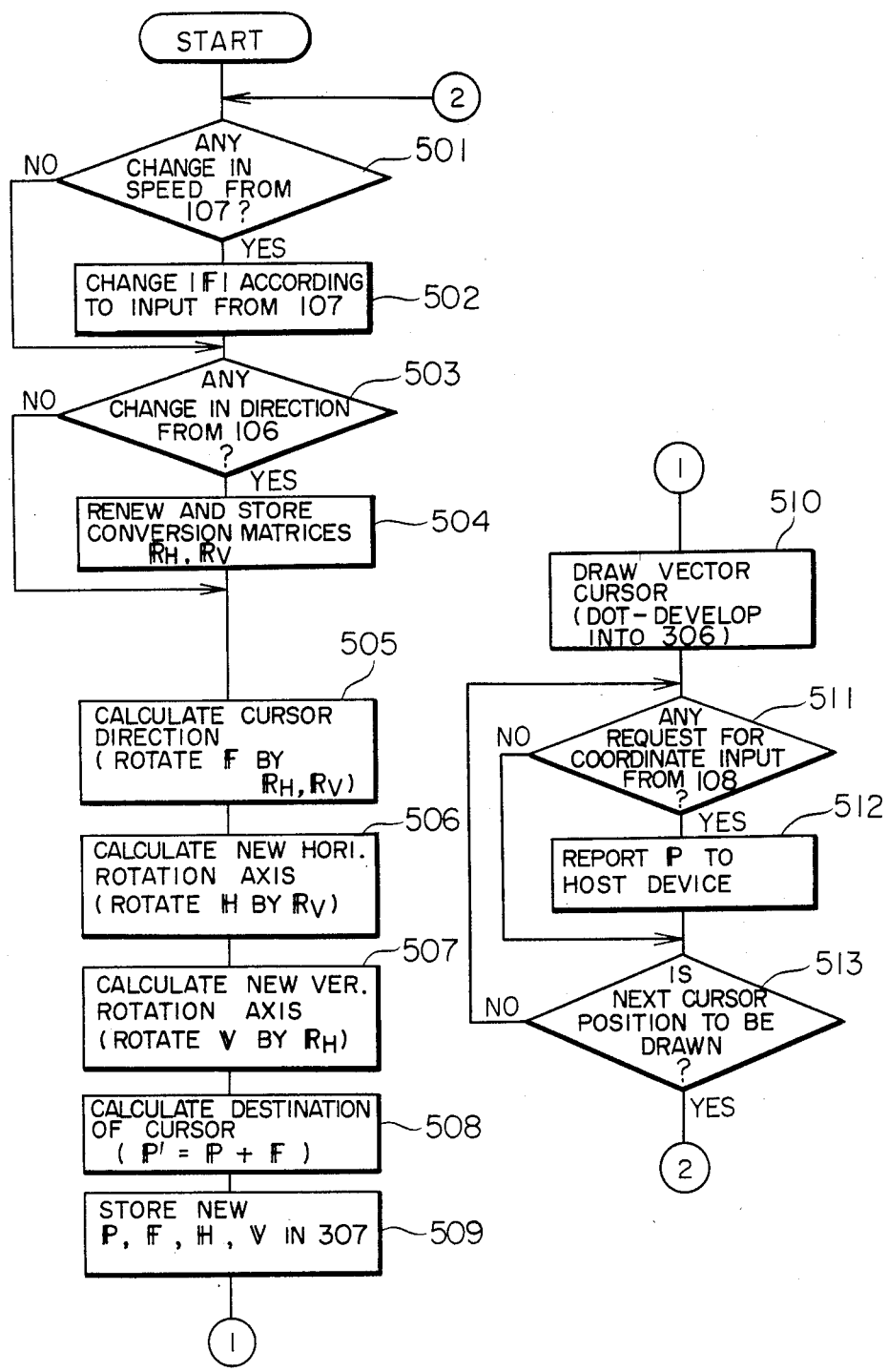
FIG. 5 shows a flow chart of a basic operation of a vector cursor control in the embodiment of the present invention.

FIG. 5 shows a flow chart for moving the vector cursor. It shows how the vector cursor control information from the input device 105 is developed to produce $\mathbb{P}$, $\mathbb{F}$, $\mathbb{H}$ and $\mathbb{V}$ and how they are stored in the vector cursor parameter storage 307.

When a vector cursor is to be newly drawn (at an initial state or when the position after the movement is to be drawn a time T after the drawing of the vector cursor), the controller 302 checks the input from the input device 105.

First, whether or not there is a velocity update input from the velocity control 107 is checked (501), and if there is, the magnitude of $\mathbb{F}$ in the storage 307 is updated (502). If the velocity is a times as large as the previous one, the new vector $\mathbb{F}'$ is represented by $$F'=(Fx',Fy',Fz')=aF=(aFx, aFy, aFz) \quad (1)$$

Then, the input from the direction control 106 is checked (503). If there is forward/backward input (h), $\theta_H$ is determined, and if there is leftward/rightward input, $\theta_V$ is determined by using the linear or non-linear relationship described above.

$$\theta_H = fh(h) \quad (2)$$

$$\theta_V = fv(v) \quad (3)$$

where fh and fv are relationships.

In order to obtain the rotation conversion matrices $\mathbb{R}_H$ and $\mathbb{R}_V$ from $\theta_H$ and $\theta_V$, the following processing based on the following formulas may be carried out.

[Three-dimensional Rotation around An Axis]

(In the following discussion, the isomorphic or homogeneous coordinate is used and each vector coordinate consists of four elements.)

When a rotation axis passes through a point (l, m, n, 1) and has a direction parallel to a vector $\mathbb{N}=(n_x, n_y, n_z)$, the coordinate (X, Y, Z, H) of a point (x, y, z, 1) rotated by $\theta$ is represented as follows.

$$(X, Y, Z, H) = \quad (4)$$

$$(x, y, z, 1) \begin{pmatrix} 1 & 0 & 0 & 0 \\ 0 & 1 & 0 & 0 \\ 0 & 0 & 1 & 0 \\ -l & -m & -n & 1 \end{pmatrix} \mathbb{R} \begin{pmatrix} 1 & 0 & 0 & 0 \\ 0 & 1 & 0 & 0 \\ 0 & 0 & 1 & 0 \\ l & m & n & 1 \end{pmatrix},$$

where $\mathbb{R}$ is a rotation conversion matrix which is represented as follows.

$$R = \begin{bmatrix} n_x^2 + (1 - n_x^2)\cos\theta & n_x n_y(1 - \cos\theta) + n_z\sin\theta & n_x n_z(1 - \cos\theta) - n_y\sin\theta & 0 \\ n_x n_y(1 - \cos\theta) - n_z\sin\theta & n_y^2 + (1 - n_z^2)\cos\theta & n_z n_y(1 - \cos\theta) + n_x\sin\theta & 0 \\ n_x n_z(1 - \cos\theta) + n_y\sin\theta & n_x n_z(1 - \cos\theta) - n_x\sin\theta & n_z^2 + (1 - n_z^2)\cos\theta & 0 \\ 0 & 0 & 0 & 1 \end{bmatrix} \quad (5)$$

In the formula (5), for $\mathbb{R}_H$, $$\theta = \theta_H$$
$$n_x = h_x$$
$$n_y = h_y$$
$$n_z = h_z \quad (6)$$

and for $\mathbb{R}_V$, $$\theta = \theta_H$$
$$n_x = V_x$$
$$n_y = V_y$$
$$n_z = V_z \quad (7)$$

$\mathbb{R}_H$ and $\mathbb{R}_V$ thus obtained are stored in the storages 308 and 309, respectively (504).

The direction of the vector cursor (the direction of $\mathbb{F}$) is determined from the formulas (4) and (5) by rotating $\mathbb{F}$ by $\theta_H$ around $\mathbb{H}$ (by using $\mathbb{R}_H$), and rotating it by $\theta_V$ around V (by using $R_V$) (505). For other elements of the vector cursor, $\mathbb{H}$ is rotated by $\theta_V$ around $\mathbb{V}$ (by using $\mathbb{R}_V$) (506)

$\mathbb{V}$ is rotated by $\theta_H$ around $\mathbb{H}$ (by using $\mathbb{R}_H$) (507)

$$\mathbb{P}' = \mathbb{P} + \mathbb{F}(\text{new value for } \mathbb{F}) \text{ (508)} \quad (8)$$

In the formula (4), l, m and n are coordinates of the point $\mathbb{P}$, that is, $l=\mathbb{P}_x$, $m=\mathbb{P}_y$ and $n=\mathbb{P}_z$, where $\mathbb{P}_x$, $\mathbb{P}_y$ and $\mathbb{P}_z$ are components.

The $\mathbb{P}, \mathbb{F}, \mathbb{H}$ and $\mathbb{V}$ are stored in the parameter storage 307 shown in FIG. 4 (509).

Since the new vector cursor parameters have been determined, the control/processing unit 302 develops the vector cursor for two dimensional display to store it into the vector cursor image buffer 306. Because it is the development of the three-dimensional image to the two-dimensional plane, the perspective conversion is carried out as is done when the data in the image command storage 304 are developed into the image buffer 305 (510).

Thereafter, the presence or absence of the coordinate input request from the input device 105 by the switch 108 is checked (511), and if it is present, the coordinate $\mathbb{P}$ of the vector cursor is reported to the host device (512).

Then, the control/processing unit 302 repeats the steps 511 and 512 until the time to calculate and display the next position of the vector cursor comes (513).

The technique of perspective conversion and rotation referred to above have been known, for example, by the article "Mathematical Elements for Computer Graphics" D. F. Rogers and J. A. Adams, McGraw-Hill, 1976.

Figure 6:
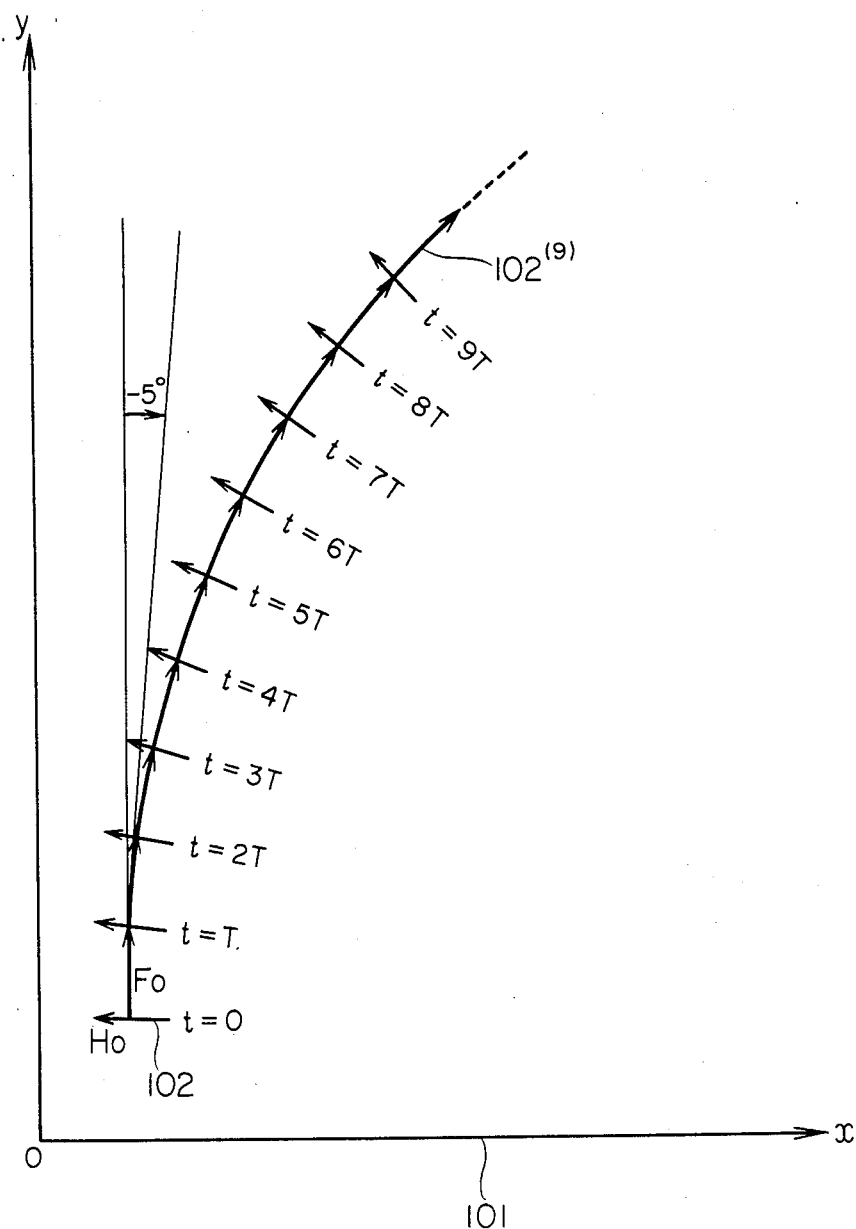
FIG. 6 shows a locus of movement of a vector cursor under a simple condition.

FIG. 6 shows a locus of a vector cursor when the above processing is carried out under the following condition from t=0 to t=9T.

① At t=0, $\mathbb{F}$ is parallel to the y-axis (directions are equal).

② At t=0, $\mathbb{H}$ is parallel to the x-axis (directions are opposite).

③ An operator continuously inclines the joy stick 106 of the input device 105 to attain $\theta_V = -5°$. No other operation is carried out.

④ Unit time for processing and drawing is equal to T.

In the present embodiment, the vector cursor to be displayed is represented by the mathematical attributes $\mathbb{P}, \mathbb{F}, \mathbb{H}$ and $\mathbb{V}$, although they are not always necessary but any spatial image which allows easy estimation of relationship with $\mathbb{P}, \mathbb{F}, \mathbb{H}$ and $\mathbb{V}$, for example, representation of an aircraft, may be used.

The velocity control 107 is provided to enhance the operability but it is not necessary for the purpose of the present invention. (Even if the vector cursor velocity is fixed, the vector cursor can reach any point in the three-dimensional space.)

Application of this invention is not limited in the use of two-dimensional screen. The present invention is also applicable to the three-dimensional display which utilizes hologram or polarization. In this case, the perspective conversion from the three-dimensional space data (in the storages 304, 307) to the two-dimensional display data (in the storages 305, 306) of the above embodiment, is not necessary.

In accordance with the present invention, designation of a position in three dimensional space displayed in a display apparatus can be done only by controlling two parameters. Thus, the operability for the operator can be improved.

We claim:

1. A three-dimensional display device comprising:
   display means for displaying a cursor as virtually located in a three-dimensional space and as moving in said space according to a velocity vector that can be changed in response to control signals representing said cursor;
   input means for inputting first parameter signals including two parameters that three-dimensionally define the direction of said velocity vector;
   control means connected between said display means and said input means for generating said control signals to display the cursor at a position virtually located in said three-dimensional space and with a configuration such that the cursor appears to move at a constant speed in a fixed direction when said parameter signals indicate no change and such that the cursor appears to change its moving direction in a direction and at a rate represented by said first parameter signals when a change occurs in said parameter signals.

2. A three-dimensional display device according to claim 1 wherein said display means displays said cursor on a two-dimensional display as a virtual image in a three-dimensional space by perspective conversion.

3. A three-dimensional display device according to claim 1 wherein said input means designates two parameters representing rotation angles about two mutually orthogonal axes in a plane normal to the moving direction of said cursor.

4. A three-dimensional display device according to claim 1 wherein said control means includes a processing unit and a storage unit.

5. A three-dimensional display device according to claim 4 wherein said storage unit includes a storage for storing parameters for designating said cursor in a three-dimensional space.

6. A three-dimensional display device according to claim 5 wherein said processing unit periodically calculates a position and a direction of said cursor to effect a new display of the moving cursor.

7. A three-dimensional display device according to claim 6 wherein said processing unit instructs display of the cursor after converting the data for display on a two-dimensional display means.

8. A three-dimensional display device according to claim 3 wherein said control means includes means for calculating a conversion matrix to change the direction of movement of the cursor based on said two parameters from said input means and means for holding the result thereof.

9. A three-dimensional display device according to claim 8 wherein said control means includes means for calculating a new cursor by using a current cursor and said conversion matrix and means for holding the result thereof.

10. A three-dimensional display device according to claim 3 wherein said input means includes means for inputting another parameter to designate a velocity of the cursor.

11. A three-dimensional display device according to claim 10 wherein said control means calculates a new cursor based on parameters entered by said input means.

12. A method of controlling display of a cursor in a three-dimensional space, comprising the steps of:
displaying a cursor as a moving image located in a three-dimensional space on a display means;
supplying first parameter signals from an input device, including two parameter signals representing a three-dimensional change of direction of the movement of said cursor;
generating control signals based on said first parameter signals, the control signals controlling the display of said cursor to move said cursor in a constant direction and at a constant speed when said first parameter signals represent no change and to move said cursor to change direction when said first parameter signals are changed.

13. A method according to claim 12 further comprising a step for periodically repeating said steps.

14. A method according to claim 13 wherein said constant direction is a direction of the latest cursor.

15. A method according to claim 12 further comprising a step for entering a velocity of the cursor, and said generating step determines a position of a new cursor based on the entered velocity.

16. A method according to claim 12 further comprising a step of perspective-converting data locating said cursor in a three-dimensional space for two-dimensional display.

17. A method according to claim 12, wherein the supplying of said first parameter signals comprises supplying two signals which represent rotation angles about two mutually orthogonal axes in a plane normal to the moving direction of said cursor.

* * * * *